(12) United States Patent
Kowitz

(10) Patent No.: US 12,261,501 B2
(45) Date of Patent: *Mar. 25, 2025

(54) SYSTEM FOR COOLING AN ELECTRIC MOTOR

(71) Applicant: Arthur Leon Kowitz, Ormond Beach, FL (US)

(72) Inventor: Arthur Leon Kowitz, Ormond Beach, FL (US)

(73) Assignee: Blak LLC, Ormond Beach, FL (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/815,495

(22) Filed: Jul. 27, 2022

(65) Prior Publication Data

US 2023/0187998 A1 Jun. 15, 2023

Related U.S. Application Data

(63) Continuation of application No. PCT/US2021/015115, filed on Jan. 26, 2021, which is a continuation-in-part of application No. 16/774,955, filed on Jan. 28, 2020, now Pat. No. 11,095,192.

(51) Int. Cl.
*H02K 5/20* (2006.01)
*H02K 9/19* (2006.01)

(52) U.S. Cl.
CPC ............... *H02K 5/203* (2021.01); *H02K 9/19* (2013.01); *H02K 2205/09* (2013.01)

(58) Field of Classification Search
CPC H02K 5/203; H02K 9/19; H02K 9/26; H02K 2205/09
See application file for complete search history.

(56) References Cited

U.S. PATENT DOCUMENTS

| 3,238,400 | A | 3/1966 | Wireman |
| 3,629,627 | A | 12/1971 | Dafler et al. |
| 3,822,389 | A | 7/1974 | Kudlacik |

(Continued)

FOREIGN PATENT DOCUMENTS

| CN | 109391072 A | 2/2019 |
| CN | 115769474 A | 3/2023 |

(Continued)

OTHER PUBLICATIONS

International Search Report and Written Opinion, mailed May 25, 2021, International Application No. PCT/US2021/015115, 9 pages.

(Continued)

*Primary Examiner* — Jue Zhang
(74) *Attorney, Agent, or Firm* — Knobbe, Martens, Olson & Bear LLP

(57) ABSTRACT

This disclosure pertains to a system for cooling an electric motor including a rotor which is connected to an output shaft, a stator disposed about the rotor, a casing in which the stator and rotor are disposed, and a cooling assembly. The cooling assembly includes an inlet configured to deliver coolant into the casing and directly onto the stator to cool the stator and an outlet configured to remove the coolant from the casing. The stator is a major source of heat within the electric motor and applying coolant directly to onto the stator is an effective method of cooling the motor.

20 Claims, 7 Drawing Sheets

(56) References Cited

U.S. PATENT DOCUMENTS

| | | |
|---|---|---|
| 4,959,570 A | 9/1990 | Nakamura et al. |
| 6,592,336 B1 | 7/2003 | Hirano et al. |
| 6,787,948 B2 | 9/2004 | Peterson et al. |
| 8,169,110 B2 | 5/2012 | Swales et al. |
| 8,502,424 B2 | 8/2013 | Esse |
| 8,829,743 B2 | 9/2014 | Watanabe et al. |
| 8,970,074 B2 | 3/2015 | Wagner et al. |
| 9,030,063 B2 | 5/2015 | Rawlinson et al. |
| 11,095,192 B1 * | 8/2021 | Kowitz .................. H02K 1/32 |
| 2003/0102728 A1 | 6/2003 | Chen et al. |
| 2003/0132673 A1 | 7/2003 | Zhou et al. |
| 2009/0077943 A1 | 3/2009 | Nakano et al. |
| 2011/0148229 A1 | 6/2011 | Esse |
| 2015/0280525 A1 | 10/2015 | Rippel et al. |
| 2016/0322876 A1 | 11/2016 | Horii et al. |
| 2017/0207683 A1 | 7/2017 | Anghel et al. |
| 2019/0115805 A1 | 4/2019 | Do et al. |

FOREIGN PATENT DOCUMENTS

| | | |
|---|---|---|
| EP | 4097830 | 12/2022 |
| GB | 320563 A | 10/1929 |
| JP | H08-10978 B2 | 1/1996 |
| JP | 2000-350414 A | 12/2000 |
| JP | 2003-324901 A | 11/2003 |
| JP | 2005-261003 A | 9/2005 |
| JP | 2007-147204 A | 6/2007 |
| JP | 2013-066348 A | 4/2013 |
| JP | 6355750 B2 | 7/2018 |
| WO | WO 2019/117229 A1 | 6/2019 |
| WO | WO 2018/221237 A1 | 11/2019 |

OTHER PUBLICATIONS

European Search Report mailed Apr. 4, 2024, European Application No. EP21747977, 12 pages.

* cited by examiner

SYSTEM FOR COOLING AN ELECTRIC MOTOR

BACKGROUND

Field of the Invention

This disclosure relates to methods and systems of cooling electric motors.

Description of the Related Art

Electric motors can be used in various applications such as automobiles, motorcycles or fans. Electric motors can include brushless alternating current (AC) motors which can include a stator disposed about a rotor to form a hollow cylindrical shape. The stator can include one or more metal core members and one or more coiled stator wires wrapped around the metal core(s). The rotor can comprise a permanent magnet and can be attached to an output motor shaft. Running an electrical current through the stator wires can create a magnetic field which can impart rotation to the rotor and turn the output shaft. The output shaft can be connected to various types of mechanical drive systems. For example, in some systems, the output shaft can drive one or more gears, which are in turn connected to a device to be moved or rotated. In some systems, the output shaft can connect to a direct drive system such that rotation of the output shaft directly imparts motion to the device to be moved or rotated, such as wheels. Thus, electric motors can be used to generate mechanical force from an electrical input. However, electric motors typically generate heat during operation, which if uncontrolled can damage the motor or larger mechanical system.

SUMMARY

In one embodiment, an electric motor is disclosed. The electric motor can include: a rotor which is connected to an output shaft; a stator disposed about the rotor; a casing in which the stator and rotor are disposed; and a cooling assembly. The cooling assembly can comprise: an inlet comprising an opening and a stream axis extending through the opening, the inlet configured to deliver a stream of liquid coolant into the casing and directly onto an outer surface of the stator to cool the stator, the stream of liquid coolant comprising a liquid jet having a momentum vector along the stream axis; an outlet configured to remove the liquid coolant from the casing; and an accumulator tank in fluid communication with the outlet, the accumulator tank configured to separate dissolved gas from the liquid coolant and to allow air to escape the accumulator tank (e.g., can be exposed to ambient to allow gas to escape to outside environs).

In some embodiments, the cooling assembly can comprise a check valve between the outlet and the accumulator tank, the check valve configured to allow the liquid coolant to flow from the outlet to the accumulator tank while blocking passage of the liquid coolant with the dissolved gas back into the casing. In some embodiments, the stator comprises one or more stator wires. In some embodiments, the stator further comprises a metal core and wherein the stator wires are wound around the metal core. In some embodiments, the inlet is configured to flow coolant directly onto the ends of the stator wires to cool the ends of the stator wires. In some embodiments, the inlet is located approximately 2 mm to 10 mm away from the ends of the stator wires. In some embodiments, the inlet comprises at least two inlets which supply multiple streams of the liquid coolant, the at least two inlets being located at different circumferential locations to flow the liquid coolant through the casing and onto different portions of the stator wires. In some embodiments, each of the inlets streams coolant onto the ends of the stator wires of different metal cores. In some embodiments, the inlet delivers coolant directly onto the outer surface of the stator without mixing with other coolant within the system. In some embodiments, the cooling assembly can comprise a pump in fluid communication with the accumulator tank, the pump configured to draw the liquid coolant from the accumulator tank. In some embodiments, the cooling assembly can comprise a heat exchanger in fluid communication with the pump, the heat exchanger configured to transfer heat from the liquid coolant to outside environs. In some embodiments, the accumulator tank comprises a breather or vent to allow the air to escape the accumulator tank. In some embodiments, the accumulator tank comprises an opening to allow the air to escape the accumulator tank. In some embodiments, the breather (or vent) or opening can be configured to expose the accumulator tank interior to the outside environs (or ambient air).

In another embodiment, a system for cooling an electric motor is disclosed. In some embodiments, the system can include a cooling assembly comprising: an inlet configured to deliver a stream of liquid coolant into a motor casing and directly onto an outer surface of a stator to cool the stator; a first outlet configured to remove the liquid coolant from the motor casing; and an accumulator tank connected to the first outlet, the accumulator tank configured to separate dissolved gas from the liquid coolant and to allow air to escape the accumulator tank (e.g., can be exposed to ambient to allow gas to escape to outside environs).

In some embodiments, the system can include a check valve between the first outlet and the accumulator tank, the check valve configured to allow the liquid coolant to flow from the first outlet to the accumulator tank while blocking passage of the liquid coolant with the dissolved gas back into the motor casing. In some embodiments, the accumulator tank is in fluid communication with the first outlet and the inlet. In some embodiments, the accumulator tank is configured to remove dissolved gases from the coolant after collecting heat from the stator. In some embodiments, the cooling assembly further comprises a second outlet configured to remove liquid coolant from the casing. In some embodiments, the second outlet is positioned adjacent to a bottom portion of the stator. In some embodiments, the first outlet is positioned above the second outlet. In some embodiments, the accumulator tank and the second outlet are in fluid communication with the inlet. In some embodiments, the system can include a pump in fluid communication with the accumulator tank and the first outlet. In some embodiments, the system can include a heat exchanger in fluid communication with the pump, the heat exchanger configured to transfer heat from the liquid coolant to outside environs.

In another embodiment, a method for installing a cooling system on an electric motor is disclosed. The method can include providing the electric motor, wherein the electric motor comprises a rotor connected to an output shaft, a stator disposed about the rotor, and a casing in which the stator and rotor are disposed; and connecting a cooling assembly to the electric motor. The cooling assembly can comprise an inlet comprising an opening and a stream axis extending through the opening, the inlet configured to deliver a stream of liquid coolant into the casing and directly onto an outer surface of the stator to cool the stator; an outlet configured to remove the liquid coolant from the casing, the stream of liquid coolant comprising a liquid jet having a momentum vector along the stream axis; and an accumulator tank in fluid communication with the outlet, the accumulator tank configured to separate dissolved gas from the liquid coolant and to allow air to escape the accumulator tank (e.g., can be exposed to ambient to allow gas to escape to outside environs).

In some embodiments, the cooling assembly comprises a check valve between the outlet and the accumulator tank, the check valve configured to allow the liquid coolant to flow from the outlet to the accumulator tank while blocking passage of the liquid coolant with the dissolved gas back into the casing. In some embodiments, connecting the cooling assembly comprises connecting the inlet to an existing portion of the casing and connecting the outlet to another existing portion of the casing. In some embodiments, connecting the cooling assembly comprises removing a portion of the casing and attaching a retrofitted portion to the casing, the retrofitted portion including the inlet and the outlet.

BRIEF DESCRIPTION OF THE DRAWINGS

Specific implementations of the invention will now be described with reference to the following drawings, which are provided by way of example, and not limitation.

DETAILED DESCRIPTION

Electric motors typically generate heat during operation. While heat can be generated from various locations through the system, a major source of heat can be from the ends of the stator wires. A casing surrounding an electrical motor typically includes a cylindrical portion that connects with a circular flat top portion and a circular flat bottom portion. The ends of the stator wires are the portions of the stator wires which run along the flat top and bottom portions of the casing that surround the cylindrical portion of the casing. Generation of heat in electric motors can cause electric motors to fail. Typically, in order to mitigate failure from over-heating, a larger electric motor is used than is desirable so that the motor runs cooler and does not overheat. Cooling the electric motor can allow a smaller motor to run a larger load and not overheat. Various electric motor cooling systems have focused on cooling the outside of a casing surrounding the stator and the rotor, such as a water jacket. These cooling systems have been ineffective because of poor heat transfer to the casing from main heat sources such as the stator. Accordingly, it would be advantageous to be able to cool the electric motor by directly cooling the stator and, in particular, the ends of the stator wires.

Various embodiments disclosed herein relate to an electric motor with a cooling system. The electric motor can include a rotor which is connected to an output shaft and a stator which is disposed about the rotor. A casing can be at least partially disposed about the stator and the rotor. The cooling system includes a cooling assembly which can include one or more inlets configured to deliver coolant into the casing and onto the stator to cool the stator. The stator can be a major source of heat when operating the electric motor. Therefore, by delivering coolant directly onto the stator, the cooling system can effectively cool the electric motor which can allow for a larger load to be mechanically powered by a smaller electric motor.

In some embodiments, the inlet can be configured to flow coolant directly onto the ends of the stator wires in order to cool the ends of the stator wires which can be a major source of heat within the electric motor. The inlet can comprise multiple inlets which flow coolant onto different locations of the stator. The distance from the inlet to the stator wires can vary depending upon the size of the motor. When the electric motor is running, the motor can splash and swirl the coolant within the engine so as to prevent the coolant flowing from the inlet from reaching the ends of the stator wires. The gap between each inlet to the ends of the stator wires may be close enough so as to adequately flow the coolant from the inlet to the ends of the stator wires. In some embodiments, the ends of the inlets can be 2 mm to 10 mm away from the ends of the stator wires.

Figure 1:
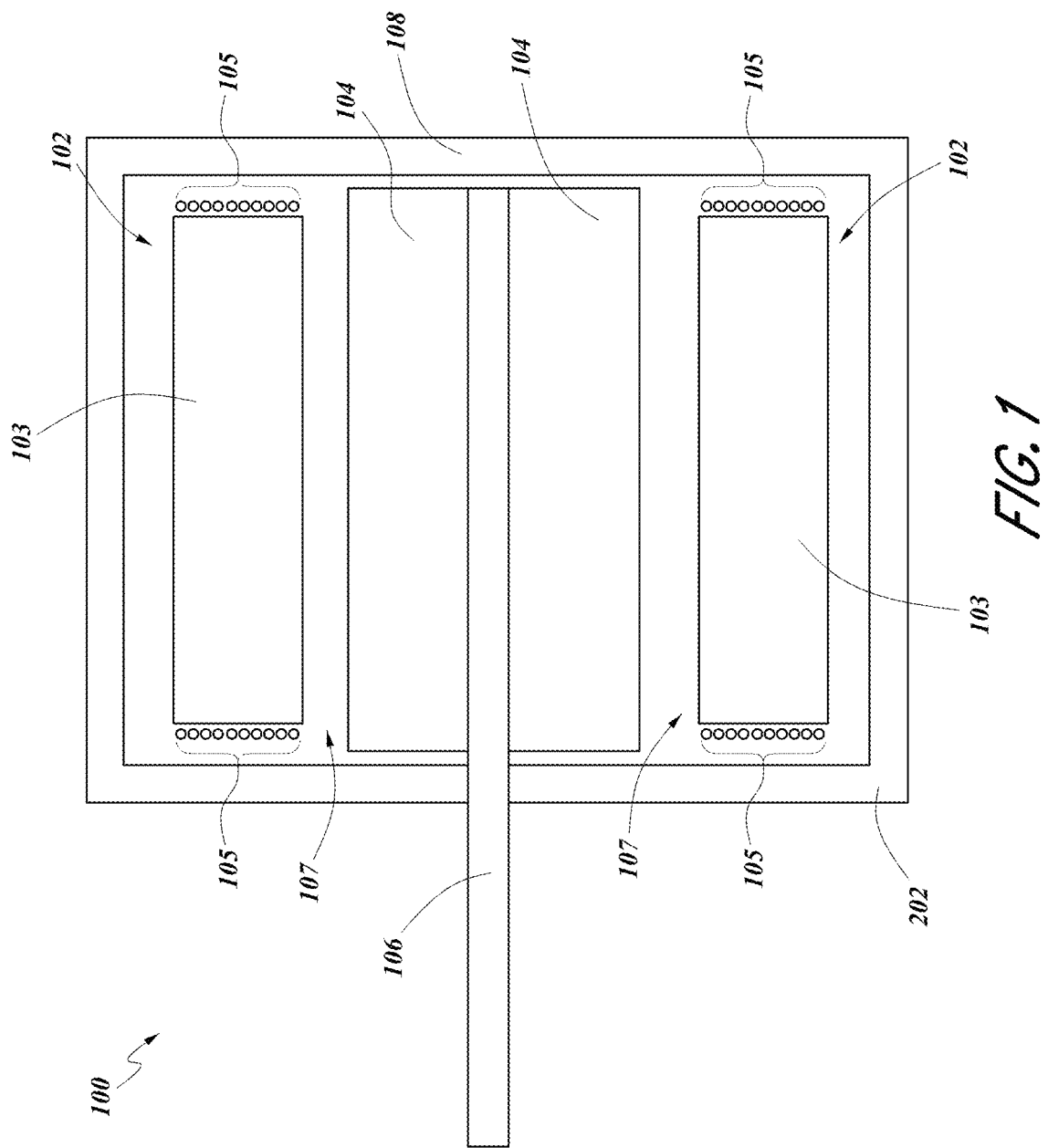
FIG. 1 is a schematic cross sectional view of an electric motor.

FIG. 1 is a schematic cross sectional view of an electric motor 100. The electric motor 100 includes stator 102 that surrounds a rotor 104 which is attached to an output shaft 106. The stator 102 includes metal cores 103 each with one or more stator wires 105 wrapped around the metal cores 103. The metal cores 103 can be made of steel or other suitable material. The metal cores 103 of the stator 102 can comprise a hollow generally rectangular shape with the stator wires 105 wrapped around the metal cores 103. In some embodiments, the stator wires 105 can be copper wires or wires made of other suitable conductive materials. The rotor 104 can comprise a magnetic material which can be a permanent magnet or an induced magnet. The rotor 104 fits into the middle of the stator 102 with an air gap 107 between the rotor 104 and the stator 102. When a current is run through the stator wires 105 of the stator 102 a magnetic field is created which interacts with the magnetic material of the rotor 104 to impart rotation to the rotor 104. Thus, the stator 102 can be stationary while the rotor 104 rotates within the stator 102. The rotor 104 can be mechanically connected to an output shaft 106 by way of any suitable type of mechanical connection, such as a press-fit or interference connection. Therefore, the shaft 106 also rotates when the rotor 104 rotates. The shaft 106 can be connected to various types of movable devices, such as wheels or gears in order to impart mechanical force on these devices. A casing 108 can be provided to encapsulate both the stator 102 and the rotor 104. The shaft 106 can protrude from the casing 108. The casing 108 can comprise one unitary piece or can be segmented into multiple pieces.

Heat is produced during the operation of the electric motor 100. Specifically, it has been discovered that the most intense heat in the electric motor 100 is generated at the ends of the stator wires 105 wrapped around each of the metal cores 103. Thus, it can be advantageous to be able to stream coolant directly onto the ends of the stator wires.

Figure 2:
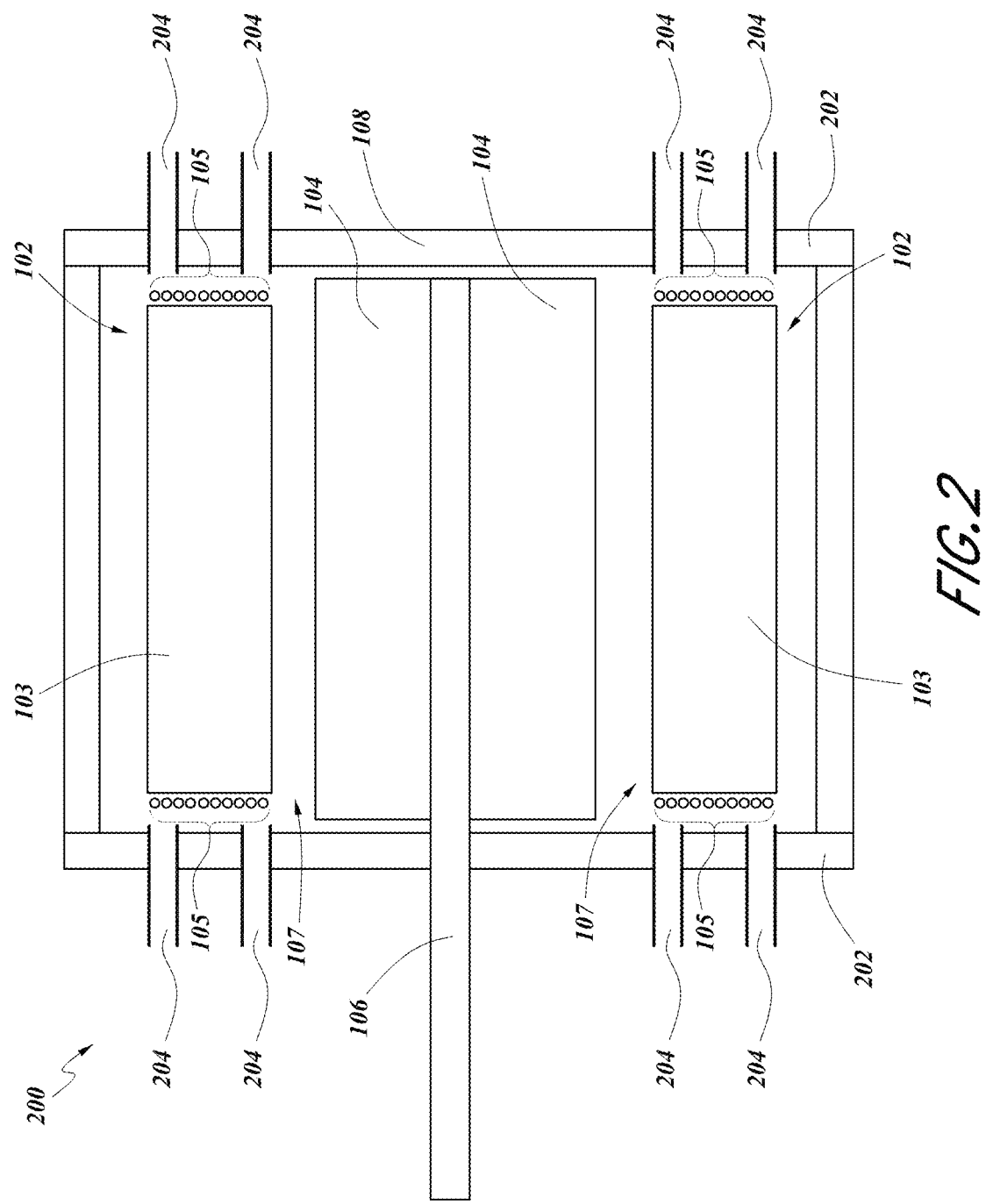
FIG. 2 is a schematic cross sectional view of an electric motor with a cooling system installed, according to various embodiments.

FIG. 2 is a schematic cross sectional view of an exemplary embodiment of an electric motor 200. The electric motor 200 shares many features of the electric motor 100 of FIG. 1. Unless otherwise noted, reference numerals of FIG. 2 may represent components that are the same as or generally similar to like-numbered components of FIG. 1. The electric motor 200 of FIG. 2 includes a cooling system which includes one or more inlets 204 for streaming liquid coolant into the electric motor 200, e.g., directly onto the stator wires 204. The casing 108 includes one or more side segments 202 which has been adapted for use with one or more inlets 204. The side segments 202 can be integrally formed with the casing 108 or can be separate pieces which has been adapted to fit with the rest of the casing 108. In some embodiments, the side segments 202 can be retrofitted for use with an existing casing. Beneficially, retrofitting the side segments 202 for use with an existing casing can allow an existing conventional electric motor to be cooled using the embodiments disclosed herein, which can improve performance and efficiency of the existing electric motor. The ends of the stator wires 204 are located near the side segments and therefore, the inlets 204 can be placed on the side segments 202 in such as location as to directly stream coolant onto the ends of the stator wires.

In some embodiments, the end of the inlets 204 can be 2 mm to 10 mm away from the ends of the stator wires of the stator 102. The distance from the inlet to the stator wires can vary depending upon the size of the motor. When the electric motor is running, the motor can splash and swirl the coolant within the engine so as to prevent the coolant flowing from the inlet from reaching the ends of the stator wires. The gap between each inlet to the ends of the stator wires may be close enough so as to adequately flow the coolant from the inlets 204 to the ends of the stator wires. In various embodiments, the inlet 204 can be configured to direct a liquid jet or other liquid stream of coolant directly onto the stator wires. The liquid stream can have a momentum along or substantially parallel to a pathway or vector of the stream, such that the liquid stream is not a stagnant liquid pool but rather a liquid stream directed along a pathway to hot spot(s) of the stator wires. The liquid stream can be directed on to the ends of the stator wires 105 as explained above. The liquid coolant can comprise any suitable type of coolant, such as an Automatic Transmission Fluid (ATF; e.g. Dextron VI). The liquid coolant can be electrically inactive such that the coolant does not short out the stator wires upon contact.

Depicted in FIG. 2, the one or more side segments 202 are two side segments 202 that are on both sides of the motor and therefore can stream coolant onto multiple circumferential locations along the stator 102. However, the one or more side segments can also be on only one side of the engine and therefore stream coolant onto only one side of the stator 102.

In FIG. 2, while the motor 200 is depicted in a vertical orientation, the motor 200 can also be run in a horizontal orientation since the ends of the inlets 204 are positioned to stream coolant directly onto the ends of the stator wires 105. As discussed previously, the ends of the stator wires 105 are the hottest portions of the motor 200 and therefore streaming coolant directly onto the ends of the stator wires 105 will continually keep these components cool. With other cooling systems where the coolant floods the motor, the orientation of the motor will affect flow of the coolant which will affect the cooling within the motor.

Figure 3:
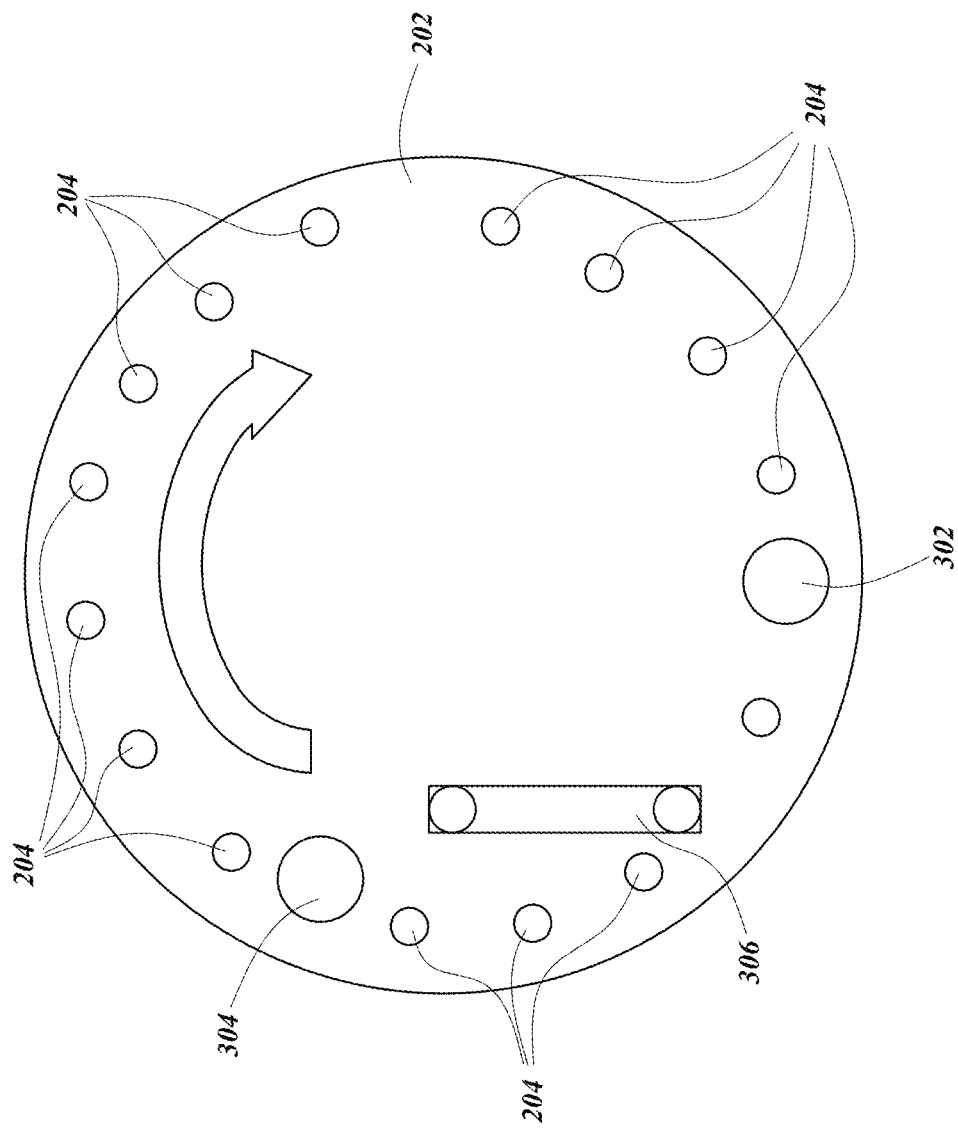
FIG. 3 is a top down view of a portion of the casing of an electric motor with a cooling system installed according to various embodiments.

FIG. 3 is a side view of an exemplary embodiment of a segment 202 of the casing 108 of the electric motor 200 illustrated in FIG. 2. As shown, the one or more inlets 204 comprises multiple inlets 204 which are located at multiple locations near the outer periphery of segment 202. There can be also inlets 204 located radially inward which can stream coolant to cool other portions of the stator 102. The Inlets 204 can be placed such that they directly stream coolant onto the ends of the stator wires. There can be more or fewer inlets 204 and the number of inlets 204 can depend on a variety of factors such as the size of the electric motor 200, the number of metal cores 103 and the amount of cooling desired. In some embodiments, the end of each of the inlets can be 2 mm to 10 mm away from the ends of the stator wires 105 of the stator 102.

Further shown in FIG. 3 is a first outlet 304 and a second outlet 302. The size of the first outlet 304 and the second outlet 302 may be larger than the inlets 204. The inlets 204 can operate under pressure whereas the first outlet 304 and the second outlet 302 operate under a vacuum source. Coolant flowing under pressure may flow faster than coolant flowing under a vacuum and the size of the first outlet 304 and the second outlet 302 can be adjusted to accommodate the different in flow rate. Also, while only a first outlet 304 and a second outlet 302 shown in FIG. 3, it should be appreciated that there can instead be more or fewer outlets. For example, one of the first outlet 304 and the second outlet 302 can be omitted. The size of the outlets 302/304 and inlets 204 can be adjusted based on number of outlets 302/304 and inlets 204. The electric motor 200 further includes a sight gauge 306 which can allow a user to visually estimate the amount of coolant within the electric motor 200 without opening the electric motor 200.

When the electric motor 200 is operating, the turning rotor can circulate coolant within the casing 108. When the coolant rotates within the casing 108, the liquid coolant can be centrifugally forced outward through the first outlet 304 and/or the second outlet 302. The second outlet 302 can be positioned near the bottom of the stator 102 and the first outlet 304 can be positioned above the second outlet 302. Thus, a first portion of liquid coolant can absorb heat from the stator 102 and can be directed centrifugally outward from the motor 200 through the first outlet 304. The positioning of the first outlet 304 and the second outlet 302 can be varied based on the orientation of the motor 200. FIG. 3 depicts the first outlet 304 and second outlet 302 based on the motor 200 in a vertical orientation.

The second outlet 302 can operate as a scavenge port to remove liquid coolant that falls to the bottom of the casing 108 due to gravity. Thus, a second portion of the coolant can absorb heat, fall to the bottom of the casing 108 due to gravity, and can exit the electric motor 200 through the second outlet 302. By having the second outlet 302 located near the bottom of the stator, the second outlet 302 keeps coolant from remaining in the electric motor 200. The low volume of coolant that remains in the motor 200 minimizes drag on the rotor 104 as it spins, which increases performance. However, by keeping a low volume of coolant within the motor 200, the coolant does not pool within the motor 200 and therefore does not continually contacts of the motor 200. As discussed previously, the ends of the stator wires 105 are the portions of the motor 200 that produce the most heat. By positioning the inlets such that coolant is streamed or jetted directly onto the ends of the stator wires 105, the motor 200 can be adequately cooled even when the volume of the coolant remaining within the motor 200 remains low. Further, by keeping the volume of the coolant within the motor 200 low, the inlet delivers fresh coolant directly onto the outer surface of the stator without mixing with other coolant within the system.

Figure 4:
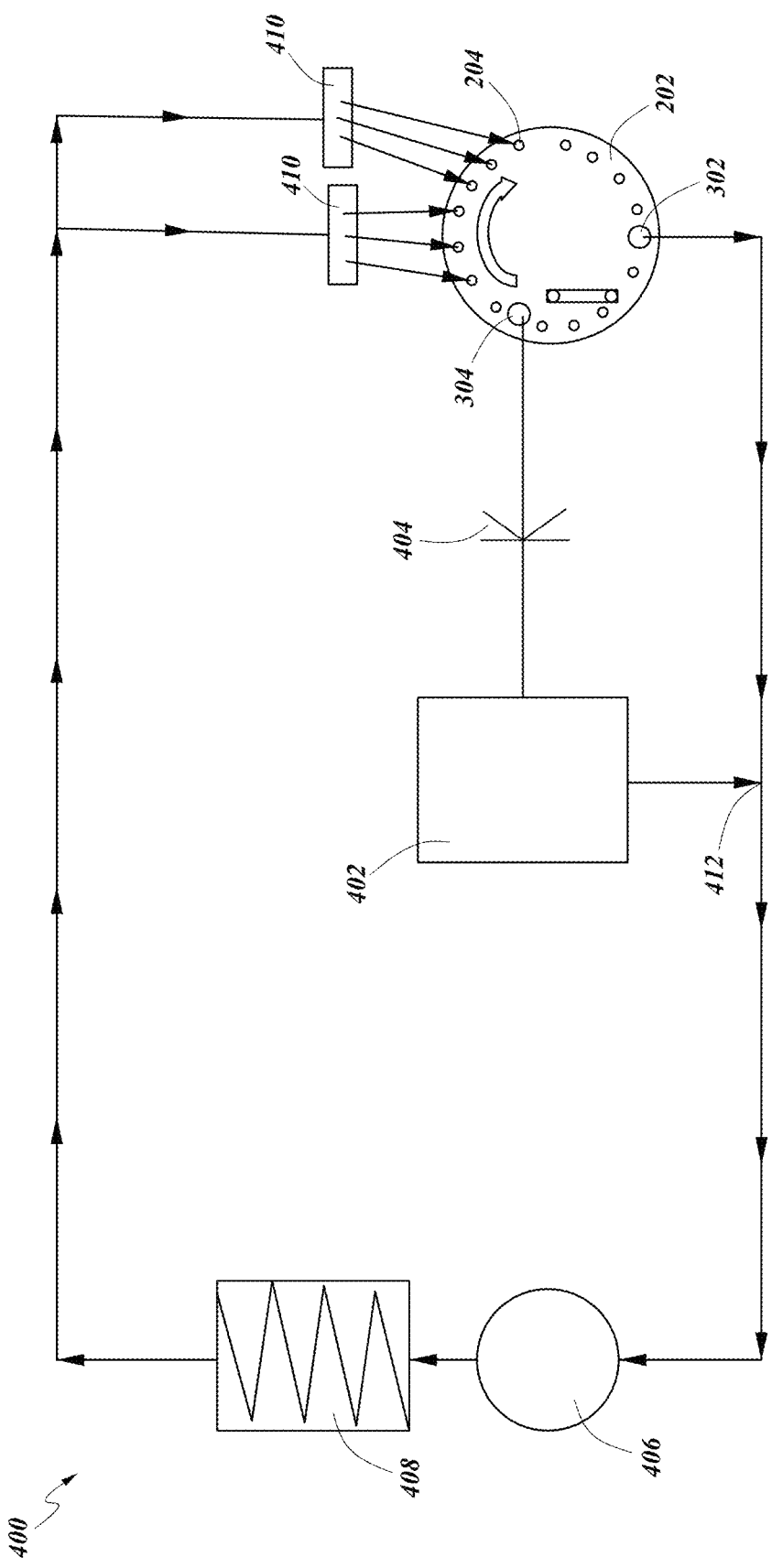
FIG. 4 is a schematic system diagram of a cooling system for an electric motor according to various embodiments.

FIG. 4 illustrates a schematic view of the cooling system 400 for the electric motor 200. Coolant flow is represented by the arrows. The coolant can be non-electrically conductive. The coolant can be a low viscosity oil or other suitable cooling fluid. The coolant can have anti-foaming characteristics such that the coolant does not easily absorb air. The cooling system 400 includes the segment 202 of the casing 108 of the electric motor 200 which was described above in FIG. 3. The features of segment 202 described above in connection with FIG. 3 are not repeated in detail. The cooling system 400 includes piping that connects the elements of the system. The piping can be metal, plastic, or a material suitable for withstanding high temperatures of the coolant of the system. As shown, the first outlet 304 can be in fluid connection with an accumulator tank 402 through a valve 404. The valve 404 can comprise a one way valve such as a check valve. The valve 404 can be configured to allow coolant to flow into the accumulator tank 402 while blocking passage of the coolant and/or system pressure back into the electric motor 200. Beneficially, the valve 404 keeps hot coolant from flowing back into the electric motor 200.

The accumulator tank 402 can comprise an expansion tank. During operation, the fluid pressure may change within the electric motor 200. The air volume within the accumulator tank 402 can absorb the pressure changes in the electric motor 200 which can decrease the chance of a coolant leak. Further, the accumulator tank 402 can collect the coolant expelled from the first outlet 304, which may be relatively frothy due to the high velocity rotational motion of the coolant within the motor 200. The frothy coolant includes air dissolved in the liquid. The accumulator tank 402 can permit the air to separate from the liquid coolant at the top of the accumulator tank 402 and the liquid coolant to settle at the bottom of the accumulator tank 402. The accumulator tank 402 can also act as the system's coolant reservoir which can minimize the amount of volume of coolant kept in the electric motor 200. Advantageously, lower coolant levels within the electric motor 200 can decrease resistance within the electric motor 200 and increase performance. The accumulator tank 402 can be placed slightly lower than the level of the electric motor 200 which can decrease the amount of static coolant within the electric motor 200. In some embodiments, the amount of coolant within the accumulator tank 402 is one third the level of the accumulator tank 402.

Further, the accumulator tank 402 and the second outlet 302 can be in fluid connection with a pump 406. The pump 406 can be activated to draw liquid coolant from the accumulator tank 402 and from the second outlet 302. In some embodiments, the second portion of the liquid coolant from the second outlet 302 can be entrained with the first portion of liquid coolant from the accumulator tank 402 (and the first outlet 304). For example, a fluid joint 412 can be provided at the intersection of the fluid pathways from the accumulator tank 402 and the second outlet 302. The pump 406 can comprise an electric pump that can be powered by a battery or another power source. In some embodiments, the pump 406 can include a brass impeller that can safely run dry. The pump 406 can further be run with frothy aerated coolant or pure liquid coolant without aeration. The pump 406 can also tolerate heat from heated coolant. Alternatively, the pump 406 can be omitted and the coolant may be circulated by the movement of the electric motor 200. Depending on the size of the electric motor 200 and the amount of coolant in the system, the centrifugal force generated by the electric motor 200 may be sufficiently high so as to drive the coolant without use of the pump 406.

The pump 406 can be in fluid connection with a heat exchanger 408. The heat exchanger 408 can transfer heat to the outside environs from the hot coolant which flows through the heat exchanger 408. The heat exchanger 408 can include fins and/or coils and outside air may flow onto the fins and/or coils in order to cool the heat exchanger 408 and thereby further cool the hot coolant. After the coolant exits the heat exchanger 408, the coolant is cooler than when the coolant enters the heat exchanger 408. Other components of the system such as the piping and the electric motor 200 can transfer heat to the outside from the coolant. The heat exchanger 408 can be omitted if the heat transferred from the coolant to the outside from the other components of the system is adequate.

With continued reference to FIG. 4, the heat exchanger 408 can be in fluid connection with one or more connectors 410. The connectors 410 can serve as a manifold to spread out the coolant into multiple streams which can connect into the inlets 204. The manifold can be positioned relative to the segment 202 so as to direct multiple streams of liquid coolant onto the stator 102. The number of streams can be the same as the number of inlets 204. The connectors 410 can be one or more connectors or the number of connectors chosen to adequately divide the coolant into the inlets 204. As shown, each connectors 410 has a separate fluid connection with the heat exchanger 408. Also, each connector 410 can have separate fluid connections with a number of inlets. For example, each connectors 410 can be connected to one to six different inlets. In some embodiments, each connectors 410 is connected to three different inlets. Also, different connectors 410 can be in fluid connection with a different number of inlets. For example, one connector can be connected to three inlets while another connector can be connected to four inlets. While in FIG. 4 connection to only six different inlets are shown, it is understood that the connectors 410 are in fluid connection with all of the inlets.

Figure 5:
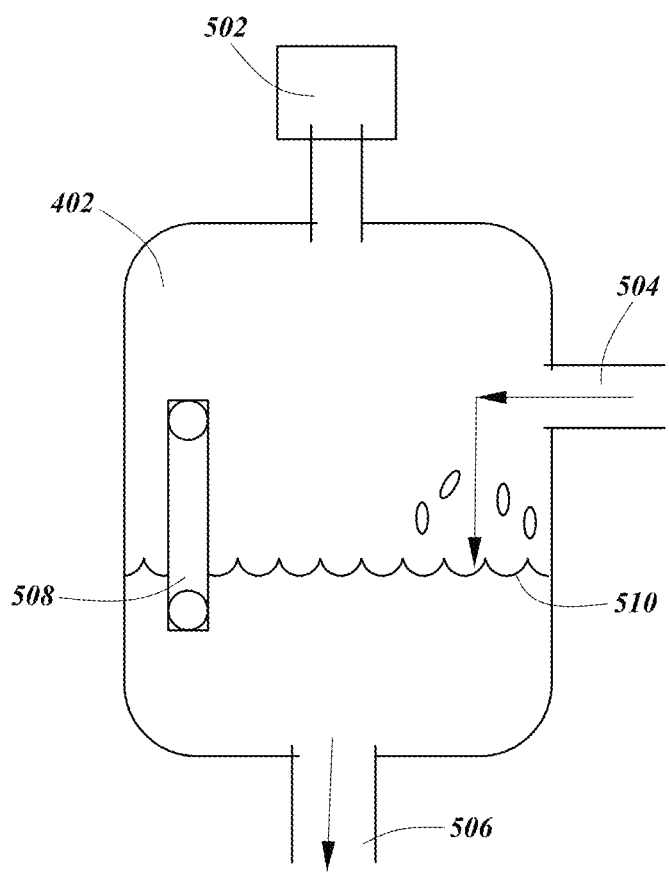
FIG. 5 is a schematic cross sectional view of an accumulator tank according to various embodiments.

FIG. 5 is a schematic view of an example accumulator tank 402 shown in FIG. 4. The coolant flow is represented by arrows and a coolant reservoir level is represented by wavy line 510. As shown, the accumulator tank 402 includes both a tank inlet 504 and a tank outlet 506. The tank inlet 504 can be located above the tank outlet 506. The tank inlet 504 can be located above or below the coolant reservoir level. The tank inlet 504 can be in fluid communication with the first outlet 304. The tank outlet 506 can be located at or near the bottom of the accumulator tank 402. The tank outlet 506 can also be located in other locations but should be located below the coolant reservoir level. In some embodiments, the pump 406 can draw the settled liquid coolant from the accumulator tank 402 by way of the tank outlet 506. The accumulator tank 508 can further include a sight gauge 508 which can display the current coolant level without having the visually open the accumulator tank 508. A breather 502 can be located at the top of the accumulator tank 508. The breather 502 can also be located at other locations however should be above the coolant reservoir level. The breather allows air to escape the accumulator tank 402 while keeping particles and other contaminates from entering the accumulator tank 402. Alternatively, the breather 502 can be omitted and replaced with an opening. The breather 502 can be removable in order to allow a user to add or remove coolant from the system.

Figure 6:
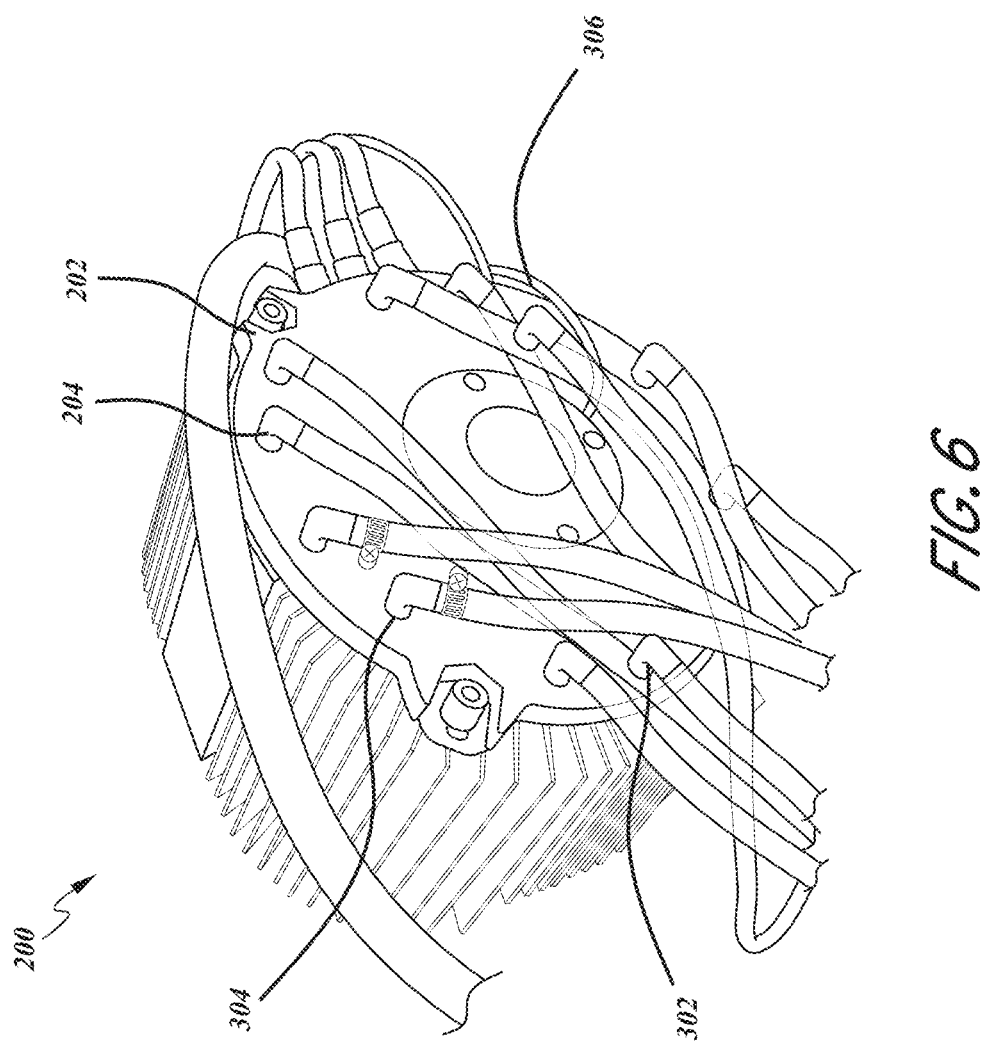
FIG. 6 is an image of an exemplary electric motor with a cooling system installed.
Figure 7:
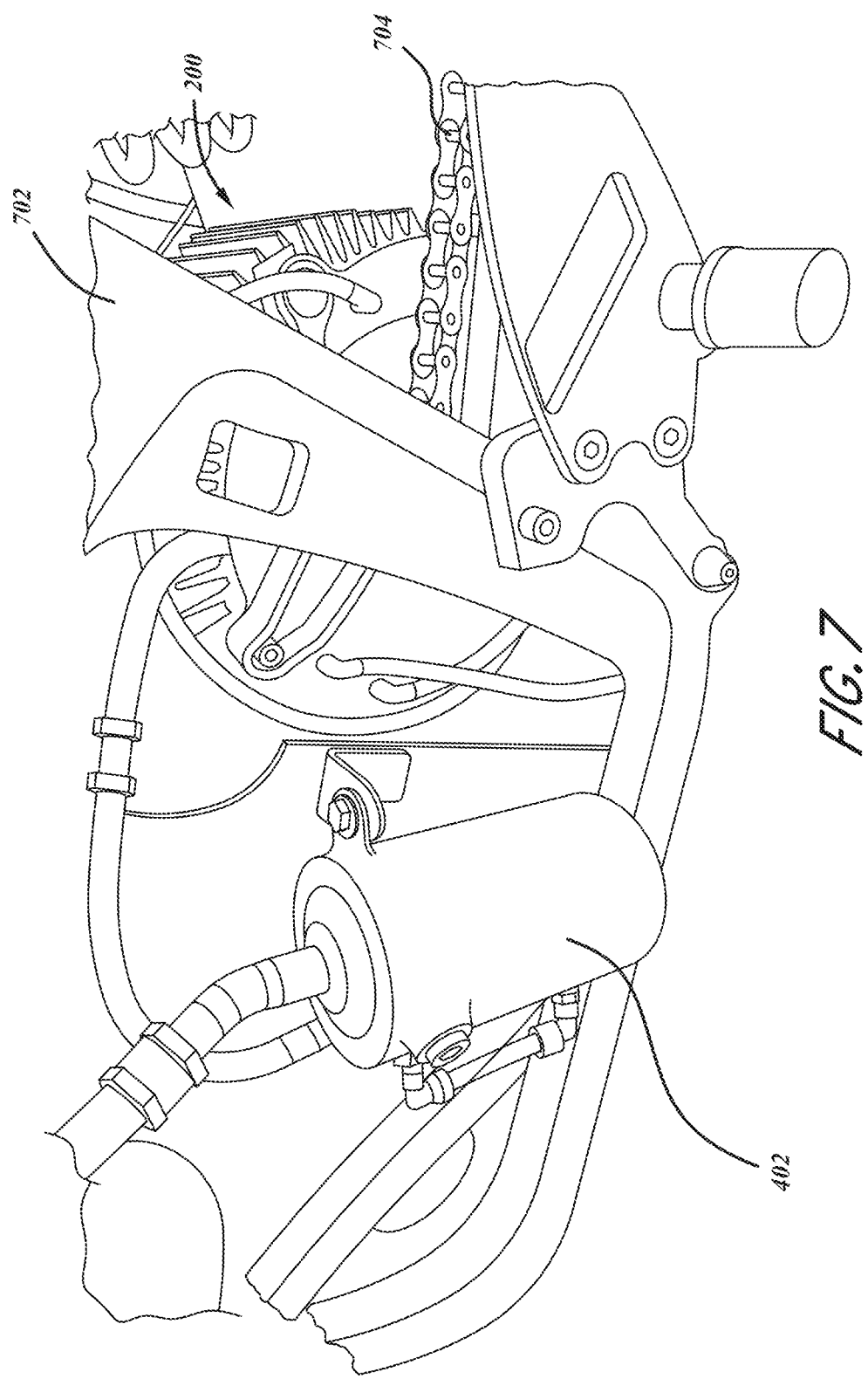
FIG. 7 is an image of an exemplary electric motor and an exemplary accumulator tank within a housing.

FIG. 6 is an image of an exemplary implementation of the electric motor 200 of FIG. 2 with the segment 202 of FIG. 3. FIG. 7. is an image of an exemplary implementation of the electric motor 200 of FIG. 2 with the accumulator tank 402 of FIG. 5. The features in the images of FIGS. 6 and 7 are the same as or generally similar to like-numbered components of FIGS. 2-5, and the description of these components is not repeated. As also shown, the electric motor 200 can be housing in a housing 702 and connected to a chain 704, which can drive a movable device, such as a wheel. The housing can also accommodate the accumulator tank 402. Further components of the cooling system 400 can also be housed by the housing.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An electric motor comprising:
   a rotor which is connected to an output shaft;
   a stator disposed about the rotor;
   a casing in which the stator and rotor are disposed; and
   a cooling assembly comprising:
      an inlet comprising an opening and a stream axis extending through the opening, the inlet configured to deliver a stream of liquid coolant into the casing and directly onto an outer surface of the stator to cool the stator, the stream of liquid coolant comprising a liquid jet having a momentum vector along the stream axis;
      an outlet configured to remove the liquid coolant from the casing; and
      an accumulator tank in fluid communication with the outlet, the accumulator tank configured to separate dissolved gas from the liquid coolant and to allow air to escape the accumulator tank.

2. The electric motor of claim 1, wherein the stator comprises one or more stator wires.

3. The electric motor of claim 2, wherein the stator further comprises a metal core and wherein the stator wires are wound around the metal core.

4. The electric motor of claim 3, wherein the inlet is configured to flow coolant directly onto ends of the stator wires to cool the ends of the stator wires.

5. The electric motor of claim 3, wherein the inlet is located approximately 2 mm to 10 mm away from ends of the stator wires.

6. The electric motor of claim 3, wherein the inlet comprises at least two inlets which supply multiple streams of the liquid coolant, the at least two inlets being located at different circumferential locations to flow the liquid coolant through the casing and onto different portions of the stator wires.

7. The electric motor of claim 6, wherein each of the inlets streams coolant onto ends of the stator wires of different metal cores.

8. A cooling system for cooling an electric motor, the system comprising:
   a fluid loop for circulating a liquid coolant for cooling the electric motor, wherein the fluid loop comprises piping;
   a casing of the electric motor in fluid communication with the fluid loop, the casing having a first outlet and a second outlet for removing fluid from a motor casing and an inlet for introducing the liquid coolant into the motor casing;
   an accumulator tank in fluid communication with the first outlet, the accumulator tank configured to separate dissolved gas from the liquid coolant and to allow air to escape the accumulator tank; and
   a check valve disposed between the first outlet and the accumulator tank, the check valve configured to allow the liquid coolant to flow from the first outlet to the accumulator tank while blocking passage of the liquid coolant with the dissolved gas back into the motor.

9. The system of claim 8, wherein the piping comprises at least one of metal and plastic.

10. The system of claim 8, wherein the inlet comprises a plurality of inlets.

11. The system of claim 8, wherein the accumulator tank is placed relatively lower than the motor to decrease an amount of static liquid coolant in the motor.

12. The system of claim 8, further comprising a pump in fluid communication with the accumulator tank and the second outlet.

13. The system of claim 12, wherein centrifugal forces generated by the electric motor and activation of the pump draw the liquid coolant from the accumulator tank and from the second outlet.

14. The system of claim 12, further comprising a heat exchanger in fluid communication with the pump, the heat exchanger configured to transfer heat from the liquid coolant to outside environs.

15. The system of claim 14, wherein the heat exchanger comprises at least one of fins and coils in which ambient fluid flows onto to cool the heat exchanger.

16. The system of claim 8, wherein the motor drives the circulation of the liquid coolant in the fluid loop.

17. The system of claim 8, further comprising one or more connectors in fluid communication with the inlet, wherein the one or more connectors distribute the liquid coolant into multiple streams.

18. The system of claim 17, wherein a number of the one or more connectors corresponds to a number of inlets of a plurality of inlets.

19. The system of claim 17, wherein different connectors of the one or more connectors are connected with a different number of inlets.

20. The system of claim 8, wherein the inlet comprises an opening and a stream axis extending through the opening, the inlet configured to deliver a stream of liquid coolant into the motor casing and directly onto an outer surface of a stator to cool the stator, the stream of liquid coolant comprising a liquid jet having a momentum vector along the stream axis.

* * * * *